United States Patent [19]
Hinckley et al.

[11] Patent Number: 5,489,255
[45] Date of Patent: Feb. 6, 1996

[54] TWO-PIECE THRUST WASHER

[75] Inventors: Peter P. Hinckley, Watertown; Steve E. Sundquist, Torrington, both of Conn.

[73] Assignee: The Torrington Company, Torrington, Conn.

[21] Appl. No.: 311,222

[22] Filed: Sep. 23, 1994

[51] Int. Cl.⁶ ................................................. F16C 19/30
[52] U.S. Cl. ............................................. 384/620; 384/622
[58] Field of Search ................................. 384/620, 622, 384/617, 615, 621, 584

[56] References Cited

U.S. PATENT DOCUMENTS

| | | |
|---|---|---|
| Re. 28,431 | 5/1975 | Alling et al. . |
| 3,713,713 | 1/1973 | Alling et al. . |
| 3,900,235 | 8/1975 | Alling et al. . |
| 3,937,541 | 2/1976 | Alling et al. . |
| 3,957,325 | 5/1976 | Babb ........................... 384/622 |
| 3,972,574 | 8/1976 | Pitner . |
| 3,981,549 | 9/1976 | Carullo . |
| 4,042,285 | 8/1977 | Dorsch . |
| 4,166,662 | 9/1979 | Chiba et al. . |
| 4,368,932 | 1/1983 | Wolzenburg . |
| 4,696,588 | 9/1987 | Tanaka et al. ............... 384/615 |
| 4,733,979 | 3/1988 | Tsuruki ......................... 384/620 |
| 4,783,183 | 11/1988 | Gardella ....................... 384/620 |
| 4,892,424 | 1/1990 | Christenson et al. ........ 384/620 |
| 4,907,899 | 3/1990 | Rhoads ......................... 384/620 |
| 4,910,847 | 3/1990 | Christenson et al. ........ 29/898.041 |
| 4,981,373 | 1/1991 | Bando .......................... 384/620 |
| 4,981,419 | 1/1991 | Kayukawa et al. .......... 417/269 |
| 5,110,223 | 5/1992 | Koch et al. .................. 384/620 |
| 5,158,375 | 10/1992 | Uchida et al. ................ 384/455 |
| 5,335,998 | 8/1994 | Mütnich et al. ............. 384/622 |

*Primary Examiner*—Lenard A. Footland
*Attorney, Agent, or Firm*—John C. Bigler

[57] ABSTRACT

A raceway portion and non-raceway portion are joined together to form a two-piece thrust washer. The raceway portion has a radially directed raceway for rollers, and the non-raceway portion extends radially outward from the raceway portion for engagement with a piloting surface. Mechanical devices, formed integrally on the raceway and non-raceway portions, join the raceway portion and the non-raceway portion together. A method of forcing the raceway and non-raceway portions together to provide a snap-together assembly is also disclosed.

8 Claims, 2 Drawing Sheets

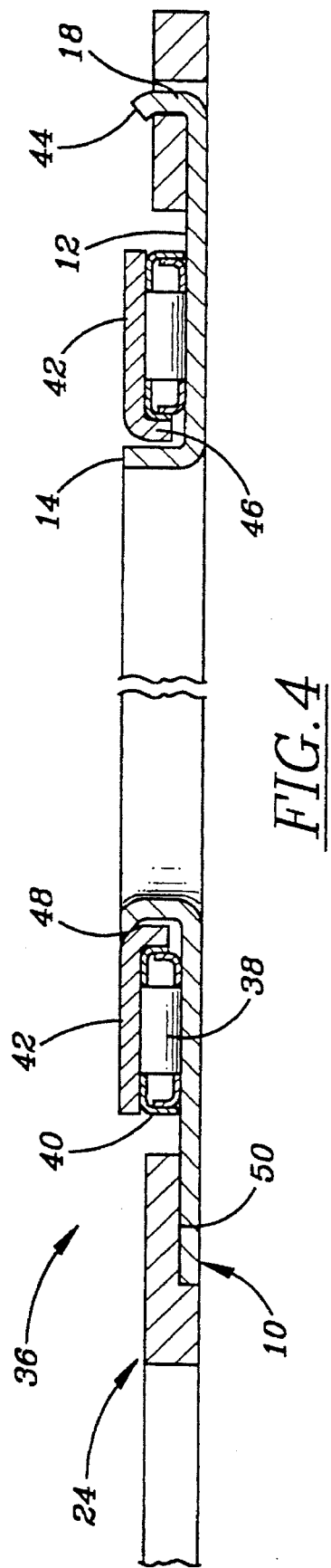

TWO-PIECE THRUST WASHER

BACKGROUND OF THE INVENTION

The present invention relates generally to thrust washers and, more particularly, to a two-piece construction for a thrust washer and method of connecting together the two pieces of the thrust washer.

Many applications, such as automobile transmissions, for example, require thrust washers that are piloted or mounted on surfaces that are radially spaced a considerable distance from the bearing raceway. Such thrust washers may be considered as having a large cross-sectional area relative to the bearing raceway area. The non-raceway portion of the thrust washer may have a simple circular perimeter or may have a complex geometry including locking tabs, for example, making manufacture more difficult.

Typically, thrust washers of this type are manufactured of a single material, such as bearing quality steel, for example, due to the requirements of the raceway portion. Heat treating of the thrust washer is generally required to achieve a suitable raceway. As a result of the heat treatment, warping, cracking and other problems may occur in either the raceway or non-raceway portions. An additional problem is the high material cost due to the use of bearing quality steel rather than a less expensive material for the non-raceway portion.

The foregoing and other aspects will become apparent from the following detailed description of the invention when considered in conjunction with the accompanying drawing figures.

SUMMARY OF THE INVENTION

In one aspect of the invention, this is accomplished by providing a two-piece thrust washer comprising a raceway portion and a non-raceway portion. The raceway portion has a radially directed raceway for rollers, and the non-raceway portion extends radially outward from the raceway portion for engagement with a piloting surface. Mechanical means, formed integrally on the raceway and non-raceway portions, joins the raceway portion and the non-raceway portion together.

In another aspect of the invention, this is accomplished by providing a method for assembling a two-piece thrust washer.

The foregoing and other aspects will become apparent from the following detailed description of the invention when considered in conjunction with the accompanying drawing figures.

BRIEF DESCRIPTION OF THE DRAWING FIGURES

FIG. 4 is a an enlarged sectional view of a thrust bearing assembly including the thrust washer raceway and non-raceway portions illustrated in FIGS. 1 through 3.

DETAILED DESCRIPTION

Figure 1:
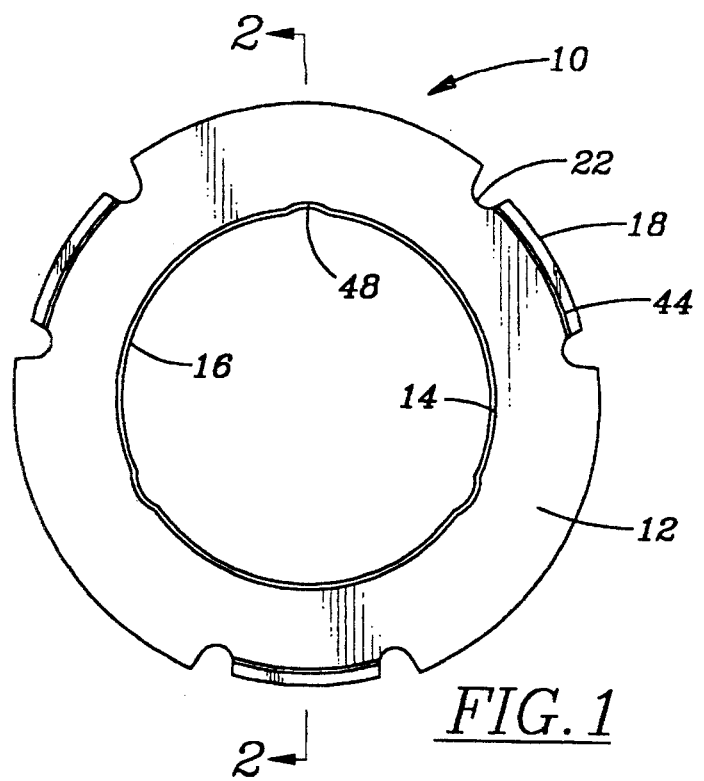
FIG. 1 is a plan view of a raceway portion of a thrust washer illustrating one embodiment of the two-piece thrust washer of the present invention.
Figure 2:
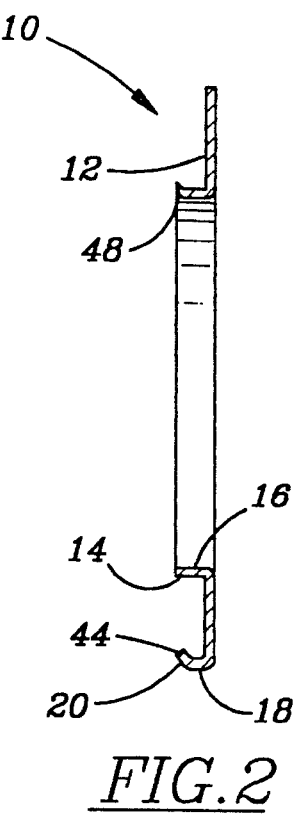
FIG. 2 is a sectional view of the thrust washer raceway portion of FIG. 1, taken along the line 2—2 of FIG. 1.

Referring now to the drawings, FIGS. 1 and 2 illustrate raceway portion 10 of a two-piece thrust washer made in accordance with the present invention. Raceway surface 12 extends radially outward from axially extending lip 14, forming circular opening 16. Three locking tabs 18, equally spaced along the outward circumference of raceway surface 12, extend axially in the same direction as lip 14 and terminate in hook portions 20, angled radially inward. Notches 22 provide stress relief and facilitate flexing of locking tabs 18.

Figure 3:
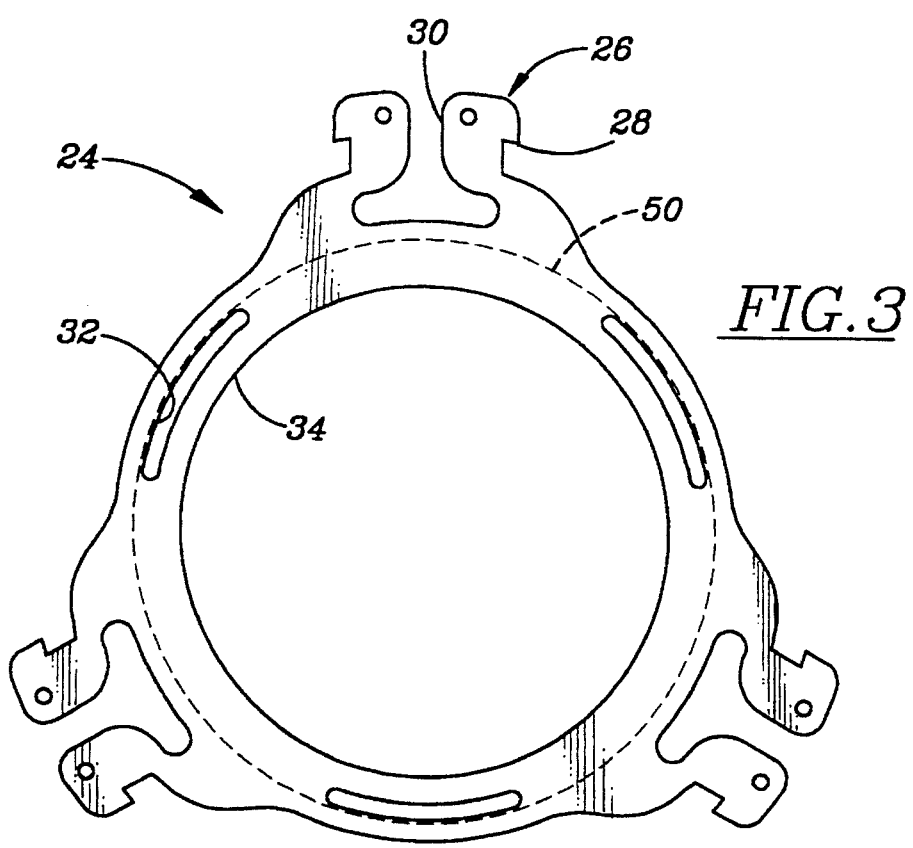
FIG. 3 is a plan view of a non-raceway portion of a thrust washer corresponding to the thrust washer raceway portion illustrated in FIG. 1.

FIG. 3 illustrates non-raceway portion 24 having a complex configuration including three pairs of locking fingers 26, equally spaced along its perimeter for locking engagement with a piloting surface of an automobile transmission, not shown. Locking fingers 26 include barb portions 28 and are separated by T-shaped openings 30 for increased flexibility. Three arcuate slots 32, equally spaced circumferentially about circular central opening 34, have a length and radial distance from central opening 34 so as to receive locking tabs 18 of raceway portion 10.

FIG. 4 illustrates two-piece thrust washer 36, shown in longitudinal section, made in accordance with the present invention and including raceway portion 10 and non-raceway portion 24 of FIGS. 1 through 3. In addition, FIG. 4 shows needle rollers 38, bearing retainer 40, and second thrust washer 42, each being conventional, mounted on two-piece thrust washer 36 to form a thrust bearing assembly.

To assemble two-piece thrust washer 36, locking tabs 18 are aligned with arcuate slots 32, and raceway portion 10 and non-raceway portion 24 are forced against each other such that hook portions 20 resiliently deflect radially outward and subsequently snap radially inward to lock the two pieces tightly together. Hook portions 20 may have angled end surfaces 44 that engage a surface of non-raceway portion 24 forming arcuate slots 32 to wedge locking tabs 18 radially outward. To facilitate assembly, two of the locking tabs 18 may be inserted to a locked position in arcuate slots 32 first, and forced radially inward such that the third locking tab 18 more easily deflects radially outward during assembly.

After assembly of two-piece thrust washer 36, bearing retainer 40 with needle rollers 38 is positioned against raceway surface 42. Next raceway 42 bearing retainer 40 and needle rollers 38 is snapped onto raceway portion 10, as shown in FIG. 4. Axially extending lip 46 of second thrust washer 42 extends between lip 14 of raceway portion 10 and bearing retainer 40. In the embodiment shown, lip 14 is mechanically retained to second thrust washer 42 by three stake locations 48 to retain the elements as an assembly while allowing free relative rotation of two-piece thrust washer 36 and second thrust washer 42.

Preferably, raceway portion 10 is formed of bearing quality steel, AISI 1074 steel, for example, and is heat treated to a through-hardened condition according to current methods for manufacturing thrust washers. Non-raceway portion 24 may be formed of less expensive, low carbon steel, A151 1010 steel, for example, without heat treatment. Offset surface 50 is provided on non-raceway portion 24 to mate with raceway surface 12 of raceway portion 10 to provide a thicker section of two-piece thrust washer 36 in the region of fingers 26 while maintaining a flush surface on two-piece thrust washer 36 on the side opposite lip 14.

Although one particular preferred embodiment is shown in the figures, the two-piece thrust washer of the present invention may take several forms and may be made of numerous materials. The non-raceway portion may have a uniform circular perimeter without locking fingers or may have any other desired configuration, as required, with greater design flexibility than with one-piece thrust washers of bearing quality steel. The non-raceway portion may be made of a polymer or other material. Also, various bore features may be incorporated in place of the simple axially extending lip 14, to accommodate different shafts, rollers and second thrust washers.

Significantly, many other integral mechanical means joining the raceway portion and non-raceway portion of the two-piece thrust washer may be used with similar effect and are anticipated by the present invention. For example, the slots may be on the raceway portion and the tabs or fingers on the non-raceway portion. Similarly, a curled-over lip or other resilient portion on one of the two pieces may engage a plurality of protrusions or a ridge on the other piece, in place of the engagement of slots by tabs. Preferably, the mechanical joining provides a snap-together retention and is effective at more than one location.

From the above description, it will be apparent that the present invention provides a thrust washer facilitating a large pilot diameter relative to a smaller bearing surface diameter. Due to the two-piece construction, the raceway portion may be heat treated without warpage, distortion and cracking problems incurred with present thrust washers having a large cross section. Manufacturing costs may also be reduced. Further features and embodiments of the invention will be apparent from the following claims.

Having described the invention, what is claimed is:

1. A two-piece thrust washer comprising:

a raceway portion having a radially directed raceway for rollers;

a non-raceway portion extending radially outward from the raceway portion for engagement with a piloting surface; and mechanical means, formed integrally on the raceway and non-raceway portions, for joining the raceway portion and the non-raceway portion together.

2. The two-piece thrust washer according to claim 1, wherein the raceway portion is made of a bearing quality steel and is heat treated.

3. The two-piece thrust washer according to claim 1, wherein the non-raceway portion is made of a material other than heat-treated bearing quality steel.

4. The two-piece thrust washer according to claim 1, wherein the mechanical means comprises a resilient portion on one of the raceway and non-raceway portions engageable with the other of the raceway and non-raceway portions to provide a snap-together retention of the raceway portion and the non-raceway portion.

5. The two-piece thrust washer according to claim 1, wherein the raceway portion includes at least one tab and the non-raceway portion includes at least one slot, the mechanical means comprising the engagement of the slot by the tab.

6. The two-piece thrust washer according to claim 5, wherein the number of tabs is three and the number of slots is three.

7. The two-piece thrust washer according to claim 5, wherein the tab is resilient and has a hook portion in engagement with the slot to lock the raceway and non-raceway portions together.

8. The two-piece thrust washer according to claim 5, wherein the tab includes an angled surface for engaging the non-raceway portion and thereby deflecting the tab during assembly of the two-piece thrust washer.

* * * * *